United States Patent
Venkata et al.

(10) Patent No.: US 7,443,922 B1
(45) Date of Patent: Oct. 28, 2008

(54) CIRCUITRY FOR PADDED COMMUNICATION PROTOCOLS

(75) Inventors: Ramanand Venkata, San Jose, CA (US); Binh Ton, San Jose, CA (US)

(73) Assignee: Altera Corporation, San Jose, CA (US)

( * ) Notice: Subject to any disclaimer, the term of this patent is extended or adjusted under 35 U.S.C. 154(b) by 1019 days.

(21) Appl. No.: 10/714,069

(22) Filed: Nov. 14, 2003

(51) Int. Cl.
*H04L 27/00* (2006.01)
(52) U.S. Cl. .................... 375/295; 375/E7.12
(58) Field of Classification Search .......... 375/295, 375/E7.12
See application file for complete search history.

(56) References Cited

U.S. PATENT DOCUMENTS

| | | | |
|---|---|---|---|
| 4,486,739 A * | 12/1984 | Franaszek et al. ............. 341/59 |
| 2001/0033188 A1* | 10/2001 | Aung et al. ................. 327/141 |
| 2002/0190751 A1 | 12/2002 | Lee et al. .................... 326/39 |
| 2003/0052709 A1 | 3/2003 | Venkata et al. ............... 326/37 |
| 2003/0058894 A1* | 3/2003 | Feuerstraeter et al. ....... 370/518 |

OTHER PUBLICATIONS

U.S. Appl. No. 10/059,014, Lee et al., filed Jan. 29, 2002.
U.S. Appl. No. 10/273,899, Venkata et al., filed Oct. 16, 2002.
U.S. Appl. No. 10/317,262, Venkata et al., filed Dec. 10, 2002.
U.S. Appl. No. 10/317,264, Venkata et al., filed Dec. 10, 2002.
U.S. Appl. No. 10/454,626, Lui et al., filed Jun. 3, 2003.
U.S. Appl. No. 10/349,541, Venkata et al., filed Jan. 21, 2003.

* cited by examiner

*Primary Examiner*—David C. Payne
*Assistant Examiner*—Nader Bolourchi
(74) *Attorney, Agent, or Firm*—Ropes & Gray LLP; Robert R. Jackson (57) ABSTRACT

Transmitter and receiver circuitry for 64b/66b encoding or other similar padded data signalling. The required transmitter clock circuitry is simplified by using one clock signal source as a basis for at least partly processing the data both before and after padding. Appropriate frequency multiplication and division factors are employed to make this possible. Similar techniques are used in receiver circuitry.

27 Claims, 5 Drawing Sheets

CIRCUITRY FOR PADDED COMMUNICATION PROTOCOLS

BACKGROUND OF THE INVENTION

This invention relates to communication circuitry, and more particularly to circuitry for handling communication of digital information to which bits are added periodically for synchronization or the like.

A communication protocol that is increasingly of interest is known as "64b/66b encoding." This is a protocol in which 64 bits of data are scrambled (e.g., to achieve balance between the number of binary ones and the numbers of binary zeros that need to be transmitted so that there is no net DC in the transmission) and two additional bits having a particular sequence are transmitted with each 64 bits as synchronization information. Thus for every 64 bits of information that need to be sent, 64 information bits and two SYNC bits are transmitted. The SYNC bits may be the sequence "10". Extra bits of this kind may sometimes be referred to herein as "padding."

Serial communication of padded information can be a challenge because of possibly complicated clocking issues. For example, 66 bits of information may need to be transmitted in the time in which the data source produces 64 bits of real data. Similarly, the receiver circuitry needs to receive 66 bits in the time in which it will subsequently pass on the 64 bits of real data in that 66-bit transmission.

SUMMARY OF THE INVENTION

Transmitter circuitry for converting unpadded blocks of data to padded blocks of data in accordance with this invention includes circuitry for deriving from a single reference clock signal first and second further clock signals having respective, different, first and second frequencies. The first frequency is suitable for use of the first further clock signal in at least some processing of the unpadded blocks. The second frequency is suitable for use of the second further clock signal in at least some processing of the padded blocks.

Receiver circuitry for converting padded blocks of data to unpadded blocks of data in accordance with the invention includes circuitry for deriving from a single reference clock signal first and second further clock signals having respective, different, first and second frequencies. The first frequency is suitable for use of the first further clock signal in at least some processing of the padded blocks. The second frequency is suitable for use of the second further clock signal in at least some processing of the unpadded blocks.

Further features of the invention, its nature and various advantages, will be more apparent from the accompanying drawings and the following detailed description.

DETAILED DESCRIPTION

Although the invention will be described herein primarily in the context of its application to 64b/66b encoding, it will be understood that the invention can also be employed in other contexts such as for other padded communication protocols. For example, the invention can be employed in contexts involving adding two (or more or less) padding bits to 64 (or more or less) information bits. Again, however, the invention will be fully understood from this specification, which principally focuses on 64b/66b encoding as an illustrative example of use of the invention.

The general architecture (organization and structure) of the illustrative transmitter and receiver circuitry shown herein can have some similarities to high-speed serial interface ("HSSI") and clock data recovery ("CDR") circuitry shown, for example, in other patent disclosures of the same assignee as this disclosure. Among the other disclosures thus referred to are Aung et al. U.S. patent application Ser. No. 09/805,843, filed Mar. 13, 2001; Lee et al. U.S. patent application Ser. No. 10/059,014, filed Jan. 29, 2002; Lee et al. U.S. patent application Ser. No. 10/093,785, filed Mar. 6, 2002; Venkata et al. U.S. patent application Ser. No. 10/195,229, filed Jul. 11, 2002; Venkata et al. U.S. patent application Ser. No. 10/273,899, filed Oct. 16, 2002; Venkata et al. U.S. patent application Ser. No. 10/317,262, filed Dec. 10, 2002; Lui et al. U.S. patent application Ser. No. 10/454,626, filed Jun. 3, 2003; Venkata et al. U.S. patent application Ser. No. 10/317,264, filed Dec. 10, 2002; and Venkata et al. U.S. patent application Ser. No. 10/349,541, filed Jan. 21, 2003. However, even though there can be similarities in some respects to such previously disclosed architectures, the present invention also involves modifications of and additions to what has been previously disclosed.

Figure 1:
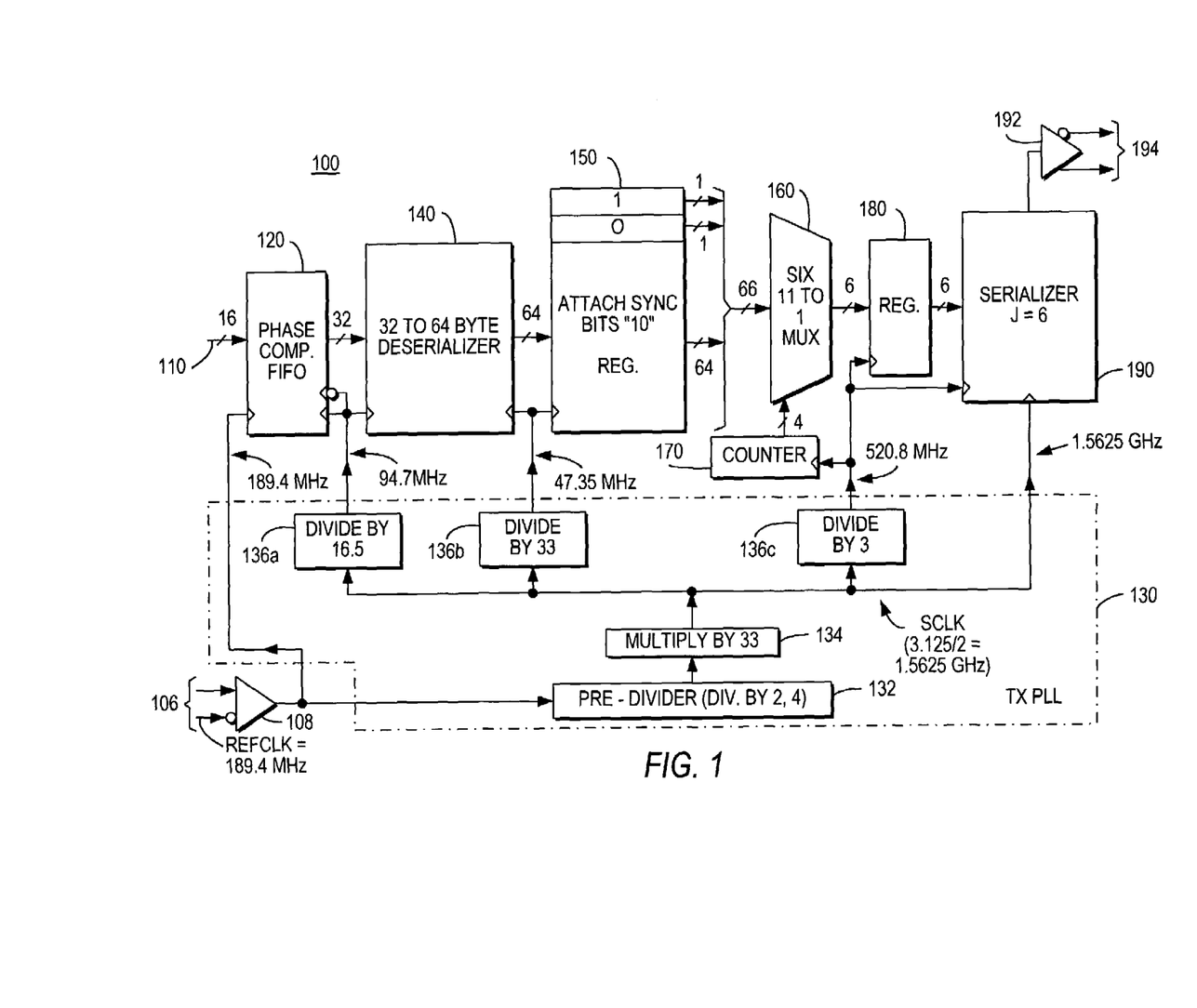
FIG. 1 is a simplified schematic block diagram of illustrative transmitter circuitry in accordance with the invention.

Illustrative transmitter circuitry 100 in accordance with the invention is shown in FIG. 1. The circuitry shown in FIG. 1 can be stand-alone or relatively stand-alone circuitry, or it can be part of any other circuitry, as desired. For example, transmitter circuitry 100 can be part of a programmable logic integrated circuit device ("PLD"), which includes programmable logic circuitry (and possibly other circuitry) in addition to circuitry 100 (see FIG. 4). (The same is true for the receiver circuitry shown in FIGS. 2 and 3 and described below.) At least some of the prior disclosures mentioned above show illustrative.

PLD circuitry that can be modified to include the present invention.

FIG. 1 shows circuitry for receiving via leads 110 successive 16-bit "words" of data. In other words, circuitry 100 receives the 16 bits of each such word in parallel via 16 leads 110. This data has already been "scrambled" into the form in which it will be transmitted by circuitry 100 as part of the 64b/66b encoding of the data. Circuitry 100 accumulates four such successive words, adds SYNC bits "10" to the front (most significant bit positions) of those 64 bits, and then transmits the resulting 66 bits serially via leads 194. Although there are two output leads 194 in the illustrative embodiment shown in FIG. 1, they are provided to support differential transmission of what is actually a single, serial output. If differential signalling is not needed or desired, then one of output leads 194 can be omitted (and differential output driver 192 can be used as or replaced by an output driver for a single, non-differential (or single-ended) output signal). (Terms like "word" and "byte" are used herein very loosely and without reference to any particular meaning they may have acquired in other contexts. For example, no particular number of bits is intended by use of the term "word" or "byte," unless an illustrative number of bits is shown herein where the term "word" or "byte" is used. Similarly, a "word" may be bigger than a "byte," or vice versa. Again, these terms are used very loosely to refer to groups of bits of various sizes. The same is true of the term "block" as used herein.)

The input signals on leads 110 are applied to phase compensation, first-in/first-out ("FIFO") circuitry 120. Circuitry 120 stores the signals applied to it in synchronism with the clock signal applied to its left-hand (or write) clock input terminal. FIG. 1 shows that this is a reference clock signal 106 (or REFCLK) having a frequency of 189.4 MHz, although any other suitable reference clock signal could be used instead if desired. The circuitry supplying data to circuitry 100 supplies successive 16-bit data words via leads 110 at the REFCLK frequency (in this case 189.4 MHz). The REFCLK signal 106 may come from the same source as the clock for the circuitry that produces the signals on leads 110, or it may come from another source having the same frequency as the clock source for the circuitry that produces the signals on leads 110. As applied to the write clock input terminal of circuitry 120, the REFCLK signal may have first passed through a clock distribution network of the circuitry that supplies the data via leads 110. In any case, there is a potential for a phase difference or mis-match between the signals being applied via leads 110 and the downstream circuitry 140, etc. that further processes those signals for transmission based at least in part on signals derived from the REFCLK signal. One of the purposes of phase compensation FIFO 120 is to compensate for any such possible phase difference.

Differential input buffer 108 is provided for the REFCLK signal because that signal is shown as a differential input. But if REFCLK is non-differential (i.e., single-ended), a non-differential input buffer 108 can be used instead.

The output (or read) side of phase compensation FIFO 120 and the components downstream from that circuit get their clock signals from transmitter phase locked loop ("TX PLL") circuitry 130. TX PLL circuitry 130 uses the REFCLK signal as a reference clock signal for PLL circuitry that is part of circuitry 130. TX PLL circuitry 130 may have the ability to pre-divide the reference clock signal frequency by a factor such as 2 or 4 or any other desired factor to increase the flexibility of use of the circuitry. Pre-division is performed by TX PLL component 132. Pre-divider 132 may be programmable with respect to the pre-division factor (e.g., 1, 2, 4, etc.) employed. In the particular example shown in FIG. 1, pre-divider 132 is assumed to pre-divide the REFCLK frequency by 4.

TX PLL circuitry 130 has the ability to multiply the pre-divided REFCLK signal frequency by a factor of 33 to produce what may be referred to as a serial clock ("SCLK") signal. Another term that is sometimes used for this type of signal is "common signal" (because this signal is a common source for several different frequency divisions that can take place). The multiplication by 33 is performed by TX PLL component 134. In the particular example shown in FIG. 1 the SCLK frequency is 1.5625 GHz (=189.4 MHz÷4×33).

TX PLL circuitry 130 has the further ability to divide the SCLK frequency by 16.5, 33, and 3. Division by 16.5 is performed by TX PLL component 136a; division by 33 is performed by TX PLL component 136b; and division by 3 is performed by TX PLL component 136c. Division by 16.5 can be readily performed by using both rising and falling edges of the signal being divided. For example, changing the state of an output signal each time a count of rising and falling edges in an input signal reaches 33 divides the frequency of the input signal by 16.5. It should be noted that reading data from phase compensation FIFO 120 and operation of all the elements downstream from that point are controlled by the output of TX PLL component 134 or signals derived from that output with only a further, relatively simple, integer-based frequency division. There is therefore little (if any) phase difference among these various clock signals, which facilitates proper operation of the various components that are clocked by them without the need for further phase compensation between those components.

In the illustrative embodiment shown in FIG. 1 the output frequency of component 136a is 94.7 MHz, which is half the REFCLK frequency. This signal is used to control reading from circuitry 120.

Because circuitry 120 is thus read only half as frequently as it is written to, twice as much data (i.e., 32 bits) is read out of circuitry 120 in response to each read clock pulse as compared to the amount of data written into that circuitry (i.e., 16 bits) in response to each write clock (REFCLK) pulse. In addition to its phase compensation function, circuitry 120 thus assembles each pair of successive 16-bit words into a single 32-bit byte. The bus from circuitry 120 to byte deserializer circuitry 140 is therefore 32 bits wide to accommodate such 32-bit bytes. Writing into circuitry 140 is also controlled by the clock signal that controls reading from circuitry 120.

Byte deserializer circuitry 140 is memory or register circuitry that can store the data from two successive reads of circuitry 120 and then output all of that data in parallel. Accordingly, the write-side clock of circuitry 140 is the same as the read-side clock of circuitry 120 as mentioned at the end of the preceding paragraph. The read-side clock of circuitry 140 is the output of TX PLL component 136b, which has half the frequency of the write-side clock output by TX PLL component 136a. The output bus width of byte deserializer circuitry 140 is 64 bits, which is twice the width of its input bus.

The output signals of byte deserializer 140 are applied to 64 of the registers in a group 150 of 66 registers. Writing into these 64 registers is controlled by the same clock signal as controls reading from byte deserializer 140. The other two registers in register group 150 always store binary 1 and binary 0, respectively, to provide the SYNC bits "10" for final transmission with every group or block of 64 data bits.

The 66 outputs of register group 150 are applied in groups of 11 to six 11-to-1 multiplexers 160. For example, the inputs to the first of multiplexers 160 are the outputs of the following registers in group 150: 65 (most significant; always binary 1), 59, 53, 47, 41, 35, 29, 23, 17, 11, and 5. The inputs to the second of multiplexers 160 are the outputs of the following registers in group 150: 64 (always binary 0), 58, 52, 46, 40, 34, 28, 22, 16, 10, and 4. The inputs to the third of multiplexers 160 are the outputs of group 150 registers 63, 57, 51, 45, 39, 33, 27, 21, 15, 9, and 3. The inputs to the other multiplexers 160 should be apparent by extrapolation from the foregoing lists.

At any one time each of multiplexers 160 selects one of its inputs to be its output. All of multiplexers 160 are controlled in parallel to make this selection by the output signals of counter 170. Counter 170 steps through the counts necessary to cause multiplexers 160 to step through their 11 inputs in repeating order in response to the clock signal output by component 136c. Thus, the first outputs of multiplexers 160 in time are the first inputs to those multiplexers in location (i.e., the outputs of registers 65-60 in register group 150 (using again the individual register numbers used in the preceding paragraph). The second outputs of multiplexers 160 in time are the second inputs to those multiplexers in location (i.e., the outputs of registers 59-54 in register group 150). This process continues until the contents of all 66 registers 150 have been output in groups of six by multiplexers 160. At that time, new data is loaded into registers 150 (except for the first two registers, which always contain binary 1 and binary 0, respectively), and the process of outputting that data (six bits at a time, via multiplexers 160) begins again.

Each group of six bits output by multiplexers 160 is registered by register circuitry 180 and then applied to serializer 190. Serializer 190 is a shift register or similar circuitry that receives six bits of data in parallel in synchronism with the clock signal output by component 136c, and then outputs those six bits one after another in synchronism with the clock signal output by component 134. On its serial output side, serializer 190 uses both the rising and falling edges of the output signal of component 134 to effectively double the frequency of that clock signal.

The serial output signal of serializer 190 is applied to differential output driver 192, which converts that signal to a pair of differential output signals 194.

From the foregoing, it will be seen that the circuitry of FIG. 1 is able to transmit 66 bits of information in the time allowed for that circuitry to receive 64 bits of data via leads 110. The circuitry of FIG. 1 speeds up the effective bit rate for data passing through it to allow the two extra sync bits "10" to be added at the start of every 64 bits of data. All of the necessary clock signals are derived from a single REFCLK signal 106 handled by a single PLL circuit 130. This greatly simplifies the clocking circuitry needed to convert information from 64 bits to 66 bits in 64b/66b encoding.

Figure 2:
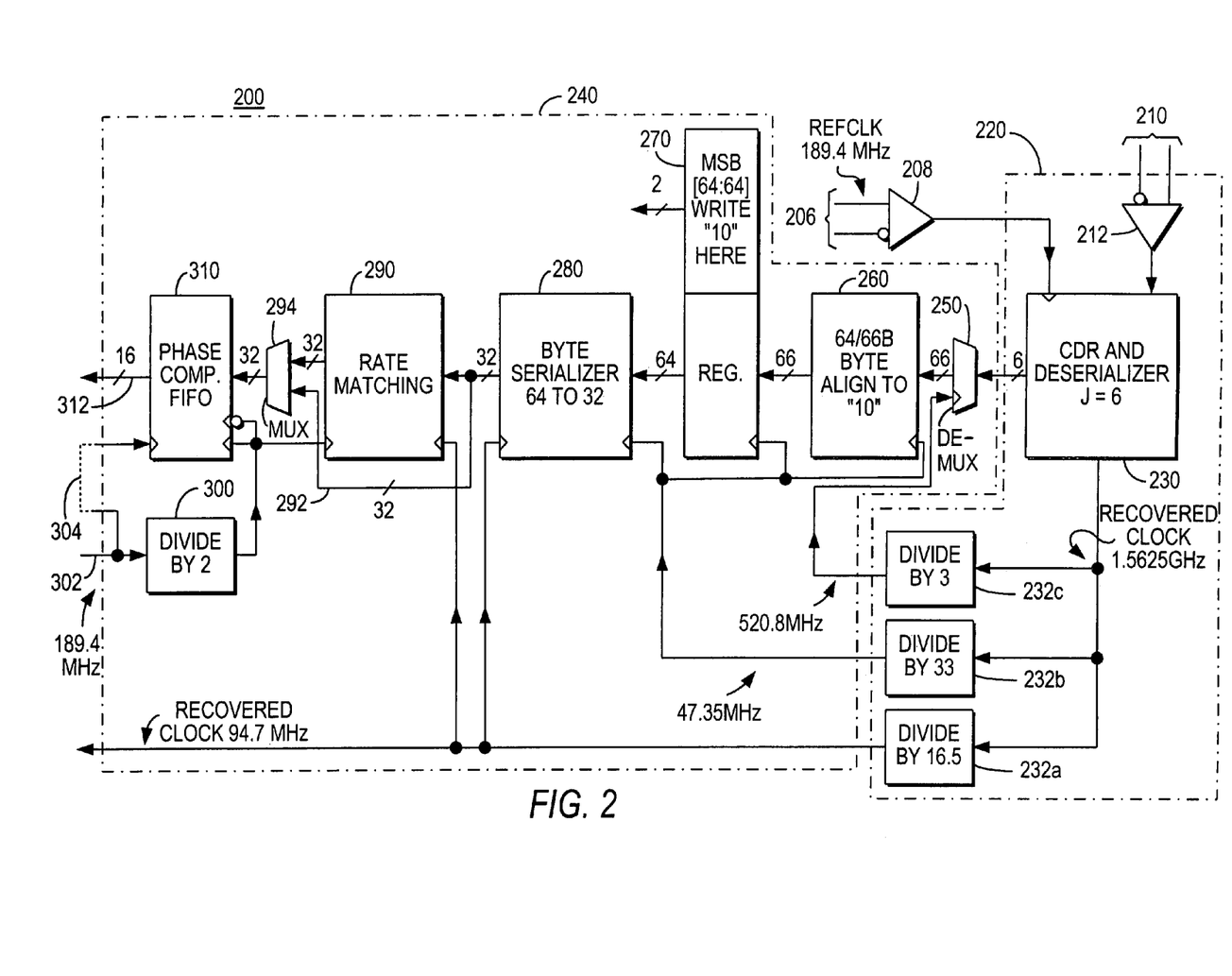
FIG. 2 is a simplified schematic block diagram of illustrative receiver circuitry in accordance with the invention.

Illustrative circuitry 200 for receiving signals of the type output by transmitter circuitry 100 is shown in FIG. 2. Receiver circuitry 200 receives a reference clock signal 206 via input buffer 208. FIG. 2 shows signal 206 as a differential signal and input buffer 208 as a differential input buffer, but signal 206 and input buffer 208 could instead be non-differential if desired. Signal 206 can have the same frequency as the REFCLK signal shown in FIG. 1 (e.g., 189.4 MHz in the illustrative example being described). The source of signal 206 can be the circuitry that receives the data outputs 312 of the circuitry shown in FIG. 2, or it can be any other suitable source.

Circuitry 200 also receives serial data signal 210 via input buffer 212. Signal 210 is like above-described output signal 194 in FIG. 1. It therefore includes data that has been 64b/66b encoded, and in the particular example being discussed its clock rate is 3.125 GHz. Although signal 210 and input buffer 212 are shown as differential, they can instead be non-differential (i.e., single-ended) if desired.

The output signals of buffers 208 and 212 are applied to clock data recovery ("CDR") and deserializer circuitry 230. An illustrative embodiment of circuitry 230 is shown in more detail in FIG. 3. Illustrative embodiments of some of the components shown in FIG. 3 (e.g., components 354, 356, and 370) are shown in the other disclosures mentioned earlier in this specification.

Figure 3:
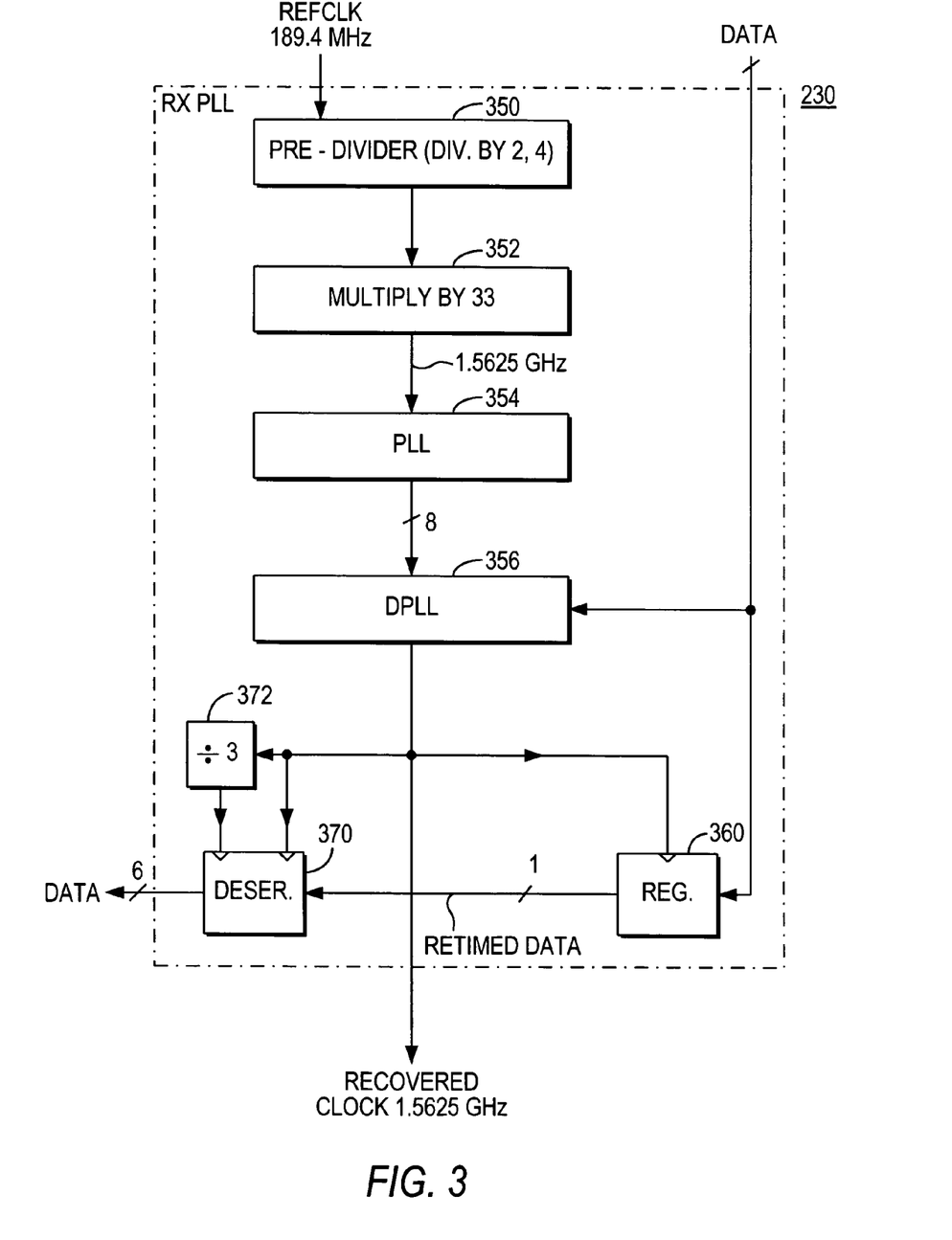
FIG. 3 is a more detailed, but still simplified, schematic block diagram of an illustrative embodiment of a portion of the circuitry shown in FIG. 2 in accordance with the invention.

Referring to the illustrative circuitry shown in FIG. 3, the REFCLK signal is applied to pre-divider circuitry 350 (similar to pre-divider circuitry 132 in FIG. 1). Circuitry 350 divides the frequency of the REFCLK signal by a selectable factor such as 2 or 4. The following discussion assumes division by 4.

The output signal of circuitry 350 is applied to frequency multiplier circuitry 352. Like circuitry 134 in FIG. 1, circuitry 352 multiplies the frequency of the signal it receives by 33. In the illustrative example being discussed, the frequency of the output signal of circuitry 352 is 1.5625 GHz.

The output signal of circuitry 352 is applied to phase locked loop ("PLL") circuitry 354. Circuitry 354 produces eight output signals, all having the same frequency but different phases. In particular, the phases of the eight output signals of circuitry 354 are equally spaced from one another throughout one complete cycle of the 1.5625 GHz clock signal received by circuitry 354.

The eight output signals of circuitry 354 are applied to so-called digital PLL ("DPLL") circuitry 356. Circuitry 356 also receives the data signal from input buffer 212 (FIG. 2). DPLL 356 uses the signals it receives to produce a recovered clock signal, the phase of which has a known and stable relationship to the phase of transitions in the data signal. This may be done by selecting the one of the eight signals from circuitry 354 having phase that best works with the data signal phase, or by interpolating between two of the signals from circuitry 354 that came closest to an optimal relationship with the phase of the data signal, or by any other suitable technique that produces a comparable result. As shown in FIG. 3, the recovered clock signal produced by circuitry 356 has the same frequency (e.g., 1.5625 GHz) as the signal applied to circuitry 354.

Both edges (rising and falling) of the recovered clock signal are used to clock the data signal into register 360. Both edges are used because the frequency of the clock information embedded in the received data signal is twice the recovered clock frequency (e.g., the serial data clock signal frequency is 3.125 GHz, which is twice the recovered clock frequency of 1.5625 GHz). The output signal of register 360 is a so-called retimed data signal that is well synchronized with the recovered clock signal.

The retimed data signal is clocked into deserializer circuitry 370 by both edges of the recovered clock signal. The input or write side of circuitry 370 can operate like a shift register to take in and store successive data bits in the retimed data signal. Periodically, the contents of circuitry 370 are output in parallel. In the particular example being discussed, this parallel outputting (reading) occurs each time six serial bits have been accumulated in circuitry 370. Circuitry 372 is provided to divide the frequency of the recovered clock signal by three to produce a clock signal for timing this parallel reading of circuitry 370 each time six bits of serial data have been accumulated by that circuitry. The recovered clock signal and the parallel data outputs of deserializer 370 are the outputs of circuitry 230 shown in FIG. 2.

Returning to FIG. 2, the receiver circuitry 220 closely associated with CDR and deserializer circuitry 230 also includes three frequency divider circuits 232a-c that operate on the recovered clock signal from circuitry 230. Frequency divider circuit 232a divides the CDR recovered clock signal frequency by 16.5 to produce another recovered clock signal. Frequency divider circuit 232b divides the CDR recovered clock signal frequency by 33. And frequency divider circuit 232c divides the CDR recovered clock signal frequency by 3. Circuitry 232c in FIG. 2 is redundant with circuitry 372 in FIG. 3, and one instance of such circuitry can perform the functions of both depicted instances, if desired. On the other hand, if redundant circuits 232c and 372 are provided, they should by synchronized with one another.

Demultiplexer 250 routes each successive six bits output by deserializer 230 to a different portion of 64B/66B byte align circuitry 260 so that circuitry 260 can operate on an accumulation of 66 bits of information. Demultiplexer 250 (which may include a counter) is clocked by the output signal of circuitry 232c to route successive 6-bit outputs of circuitry 230 to successive different portions of circuitry 260. Circuitry 260 uses the clock signal that is output by frequency divider circuitry 232b, which clock signal is at the 66-bit block rate of the data (i.e., 47.35 MHz). Circuitry 260 performs a "byte alignment" type of operation on the data that it receives based on trying to find the "10" sequence at the same location in a sufficient number of successive groups of 66 bits to make it certain that this is the location of the "10" sync bits in the data. Once circuitry 260 has thus identified the location of the sync bits in the data, circuitry 260 thereafter routes each group of 66 bits that begins with the sync bits to register circuitry 270, with the sync bits going into the top two registers in circuitry 270 and the following 64 bits going in order into the 64 registers below the top two. This is a parallel transfer of 66 bits from circuitry 260 to circuitry 270 at the clock rate output by frequency divider circuitry 232b.

The contents of the top two registers in circuitry 270 can be ignored, but each successive group of 64 bits in the lower 64 registers in circuitry 270 are shifted in parallel to byte serializer circuitry 280 at the clock rate output by frequency divider circuitry 232b. Byte serializer circuitry 280 outputs each 64 bits of data it receives in two separate, successive groups of 32 bits at the clock rate output by frequency divider circuitry 232a. Each such group of 32 bits is loaded into rate matching circuitry 290 in synchronism with that same clock signal.

Rate matching circuitry 290 can be FIFO memory circuit, which accepts successive groups of 32 bits in synchronism with the clock signal output by circuitry 232a, and which outputs the oldest, not-previously-output group of 32 bits in synchronism with the output signal of divide by 2 circuitry 300. Circuitry 300 receives a reference clock signal 302 having the same basic frequency as REFCLK signal 206. Circuitry 300 divides the frequency of the signal it receives by 2. In some systems signals 206 and 302 may come from the same ultimate source, in which case there will be no possibility of any frequency (rate) difference between them, and rate matching circuitry 290 will not be needed. In that event, the path 292 around circuitry 290 can be used (in conjunction with appropriate setting of multiplexer 294) to bypass circuitry 290. On the other hand, if the ultimate sources of signals 206 and 302 are different, then the possibility of some frequency (rate) difference between them exists. Circuitry 290 is used to compensate for such possible frequency difference (multiplexer 294 then being set to pass the output signals of circuitry 290 rather than the bypass signals on leads 292).

The output signals of multiplexer 294 are applied to phase compensation FIFO circuitry 310. Circuitry 310 receives and stores successive groups of 32 bits of data at the clock rate output by circuitry 300. Circuitry 310 outputs the oldest not-previously-output group of 16 bits it contains in synchronism with clock signal 302 (possibly after propagation of clock signal 302 through a clock distribution network 304 of the circuitry (not shown) that will receive the data output signals 312 of circuitry 310). Circuitry 310 thereby compensates for any phase difference between clock signal 302 before and after propagation through clock distribution network 304. Circuitry 310 also breaks each group of 32 bits it receives down into two successive sub-groups of 16 bits each. The output signals 312 of circuitry 310 still have the data encoding characteristic of 64b/66b signalling (although the sync bits have been stripped off as described above). The circuitry (not shown) that receives signals 312 typically reverses this 64b/66b data encoding to recover the original data.

As in the case of the transmitter circuitry shown in FIG. 1, the illustrative receiver circuitry shown in FIGS. 2 and 3 simplifies the clock-related circuitry required to perform 64b/66b decoding. Only a single clock signal source (REFCLK 206) is needed by receiver circuitry 200. Similarly, receiver circuitry 200 needs only a single PLL circuit (part of CDR and deserializer circuitry 230 (as shown in more detail in FIG. 3)) for its various data clocking operations. Receiver circuitry 200 allows this single clock signal source and PLL to serve both the data clock requirements of the 66-bit domain or portion of the receiver circuitry and the 64-bit domain or portion of that circuitry.

We will now briefly recapitulate some of the principles that underlie what has been shown and described thus far. We will first consider transmitter principles. Then we will consider receiver principles. It will be appreciated, however, that there are common aspects to the transmitter and receiver principles.

The REFCLK signal typically has a close frequency relationship to the rate at which the unpadded data is supplied to the transmitter circuitry. For example, if each unpadded data block (64 bits in the particular example being discussed) is supplied as a plurality of successive, parallel data sub-blocks (e.g., sub-blocks of 16 bits each in the example being discussed), then the REFCLK signal frequency typically has a relatively simple relationship to the rate at which the sub-blocks are supplied. In the particular example being discussed, the REFCLK frequency (189.4 MHz) is the rate at which the sub-blocks are supplied. The ratio between the REFCLK frequency and the sub-block rate is therefore 1. But this ratio could have any other value that is preferably relatively simple and integer-based. ("Integer-based" means an integer multiple of twice the REFCLK frequency (because both positive-going and negative-going edges in any clock signal such as REFCLK can be used if desired) or an integer fraction of twice the REFCLK frequency (e.g., ½, ⅓, ¼, ⅛, ⅔, etc.).) Although the sub-blocks of unpadded data have been shown and described as consisting of plural bits (e.g., 16 bits per sub-block), in one extreme case each sub-block could be a single bit (i.e., the unpadded data could be supplied completely serially). Even in that case, however, the REFCLK frequency preferably has the above-described integer-based relationship to the unpadded sub-block (bit) rate.

The transmitter circuitry preferably sends out padded data at the same rate that it receives unpadded data so that there is no net accumulation of untransmitted data in the transmitter (as would result if input was faster than output) and, conversely, so that there are no gaps in the transmission (as would result if output was faster than input). It is also assumed herein that the padded data is transmitted serially.

To facilitate use of a single clock signal source in processing both the incoming unpadded data and the outgoing padded data within the foregoing constraints, the REFCLK signal is preferably subjected to integer-based frequency manipulations that yield further clock signals with different frequencies that are respectively suitable for processing the data before and after padding. In particular, the integer-based manipulations typically first bring the REFCLK frequency to a frequency ("a common signal" frequency) that is suitable for use in processing the padded data (either directly or after a further integer-based frequency manipulation), and that is also suitable after another further integer-based frequency manipulation for use in processing the unpadded data. In the particular example being discussed, the first of the above-mentioned integer-based frequency multiplications are pre-division of the REFCLK frequency (189.4 MHz) by 4 and multiplication of the resulting frequency by 33 to produce a common signal having a frequency of 1.5625 GHz. That common signal is usable directly in certain processing of the padded data (e.g., in serializer 190). It is also usable after frequency division by 3 in other processing of the padded data (e.g., in elements 160, 170, and 180). The common signal can also be frequency divided by 16.5 and 33 to produce further clock signals for use in processing the unpadded data (e.g., in elements 120, 140, and 150). (Division by 16.5 is "integer-based" because it is the same as dividing twice the common signal frequency by the integer 33.)

Another way to state the foregoing is that a first level of integer-based frequency manipulation (e.g., divide by 4, then multiply by 33) is used to shift the frequency of the REFCLK signal to a common signal frequency (e.g., 1.5625 GHz) that can be subjected to at least one further integer-based frequency manipulation (e.g., divide by 16.5 or divide by 33) to produce at least one further clock signal suitable for use in processing the unpadded data, while either the common signal or another further clock signal produced by yet another integer-based frequency manipulation of the common signal (e.g., divide by 3) is used in processing the padded data.

On the receiver side the principles used are similar. The REFCLK signal is subjected to a first level of integer-based frequency manipulation (e.g., divide by 4, then multiply by 33) to produce a common signal. The common signal has a frequency that makes it usable either directly or after a further integer-based frequency manipulation (e.g., divide by 3) in processing the incoming padded data. The frequency of the common signal is also such that another further integer-based frequency manipulation (e.g., divide by 33 or divide by 16.5) produces at least one further clock signal suitable for use in processing the data after it has been unpadded.

Figure 4:
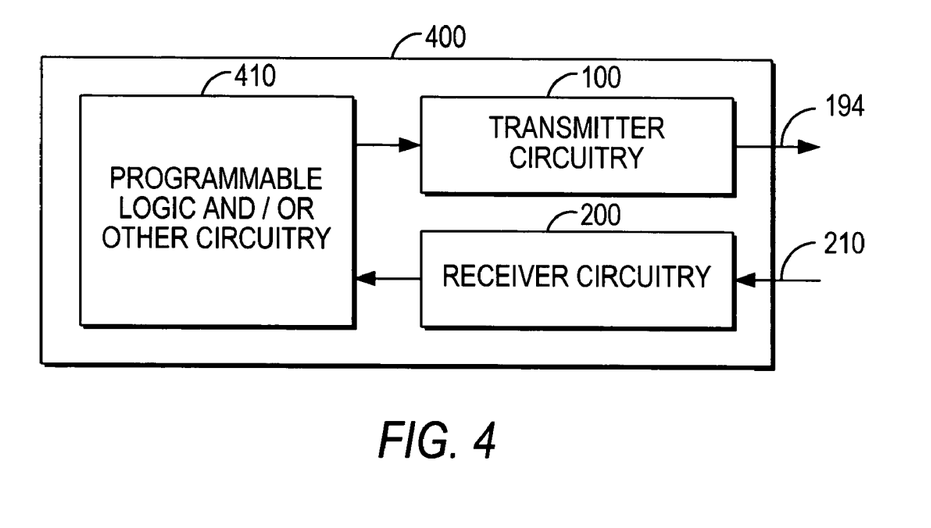
FIG. 4 is a simplified block diagram showing an illustrative larger context in which circuitry of the type(s) shown in FIG. 1 and/or FIG. 2 can be employed in accordance with the invention.

FIG. 4 shows how circuitry of the type shown in FIG. 1 and/or FIGS. 2 and 3 may be used with other circuitry. In the illustrative embodiment shown in FIG. 4 one instance of transmitter circuitry 100 (e.g., as shown in FIG. 1) and one instance of receiver circuitry 200 (e.g., as shown in FIGS. 2 and 3) are included in a system 400 (e.g., on an integrated circuit) with programmable logic and/or other circuitry 410. In other similar embodiments, either circuitry 100 or circuitry 200 can be omitted, or multiple instances of either or both of these circuitries can be provided in system 400. Programmable logic and/or other circuitry 410 may provide signals 110 (FIG. 1) to transmitter circuitry 100, and circuitry 410 may also provide REFCLK signal 106 to circuitry 100. (Alternatively, the REFCLK signal may come from a source external to system 400.) Programmable logic and/or other circuitry 410 may receive signals 312 (FIG. 2) from receiver circuitry 200, and circuitry 410 may also receive a recovered clock signal from circuitry 200, and it may supply clock signal 302 and/or 206 to circuitry 200. (Alternatively, signal 206 may come from a source external to system 400.)

Figure 5:
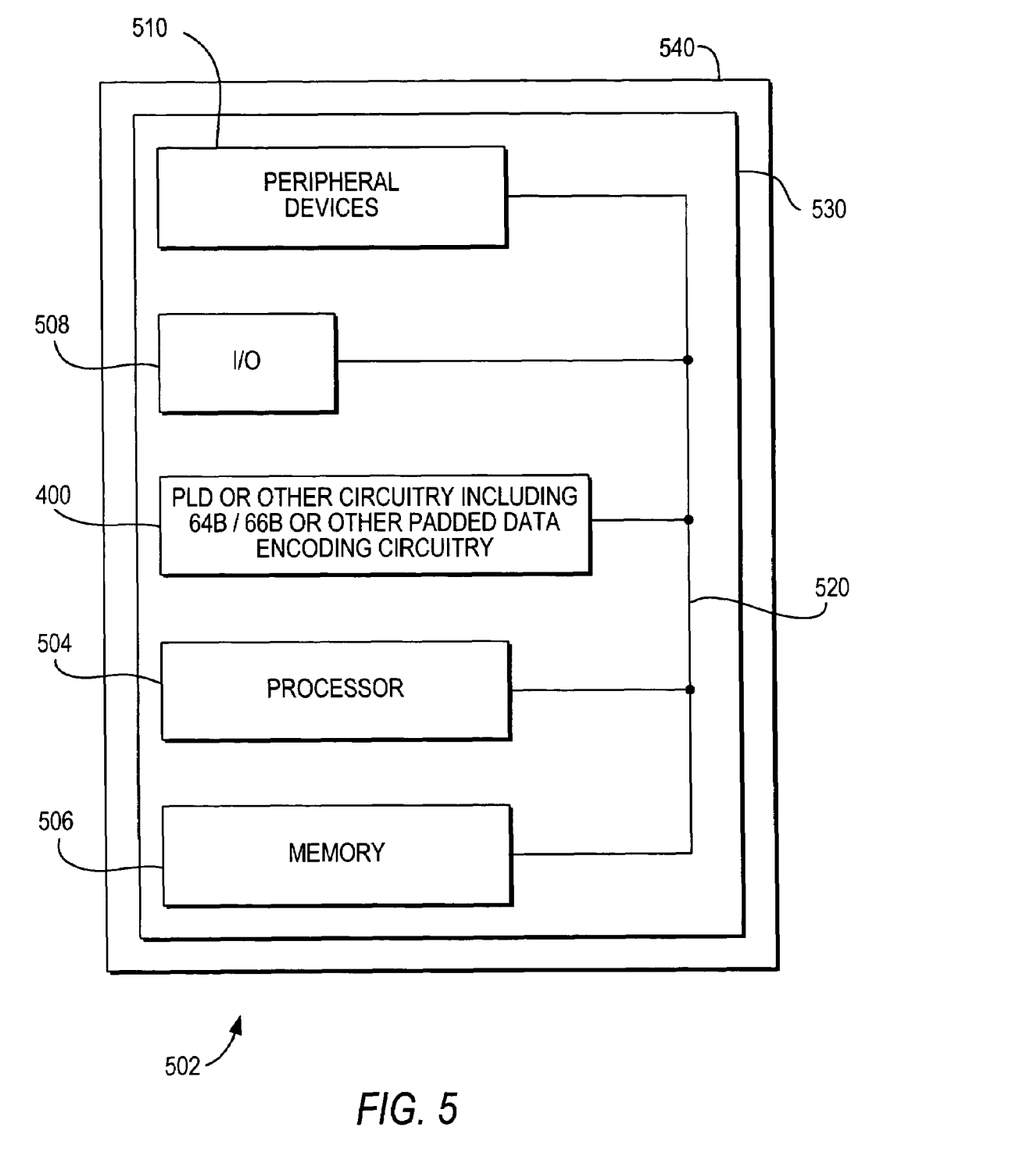
FIG. 5 is a simplified block diagram of an illustrative larger system that can be constructed in accordance with the invention.

FIG. 5 illustrates a PLD or other circuitry 400 (e.g., as in FIG. 4) including 64b/66b or other padded data encoding circuitry in accordance with this invention in a data processing system 502. Data processing system 502 may include one or more of the following components: a processor 504; memory 506; I/O circuitry 508; and peripheral devices 510. These components are coupled together by a system bus or other interconnections 520 and are populated on a circuit board 530 that is contained in an end-user system 540. Signalling among elements 400, 504, 506, 508, and 510 may employ 64*b*/66*b* or other padded data encoding to any desired extent. For example, any of components 504, 506, 508, and 510 that it is desired for component 400 to communicate with using 64b/66b or other padded data encoding may also include another instance of circuitry like 400 to provide compatible signalling capability at both ends of the circuitry that is to be used for that communication.

System 502 can be used in a wide variety of applications, such as computer networking, data networking, instrumentation, video processing, digital signal processing, or any other application. Circuitry 400 may be used to perform a variety of different logic functions. For example, circuitry 400 may be configured as a processor or controller that works in cooperation with processor 504. Circuitry 400 may also be used as an arbiter for arbitrating access to a shared resource in system 502. In yet another example, circuitry 400 can be configured as an interface between processor 504 and one of the other components in system 502. It should be noted that system 502 is only exemplary, and that the true scope and spirit of the invention should be indicated by the following claims.

It will be understood that the foregoing is only illustrative of the principles of the invention, and that various modifications can be made by those skilled in the art without departing from the scope and spirit of the invention. For example, the particular frequencies shown in FIGS. 1 and 2 are only illustrative, and other frequencies can be used instead if desired. Similarly, the particular bus widths shown in FIGS. 1 and 2 are only illustrative, and other bus widths can be employed if desired. 64b/66b encoding is only one example of the general type of padded data encoding to which the invention can be applied. The frequency multiplication and/or division factors employed in various components may be selectable (e.g., programmably selectable). Similarly, the effective widths of various data buses and the effective widths of various components that receive data from or output data to those buses may be selectable (e.g., programmably selectable).

What is claimed is:

1. Apparatus for receiving and unpadding, successively received, padded blocks of data, each of the padded blocks of data including a first number of data bits that the apparatus initially receives serially in a serial data signal, and each of the padded blocks being converted by the apparatus to an unpadded block that includes a second number of data bits that is less than the first number, the apparatus comprising:
    means for deriving from a single reference clock signal first and second further clock signals having respective, different, first and second frequencies;
    means for using the first further clock signal to assemble in parallel from the serial data signal a group of successive data bits equal in number to the first number without regard for where in the group padding bits occur; and
    means for using the second further clock signal to separate from successive ones of the groups successive unpadded blocks and to output each of said unpadded blocks in parallel.

2. The apparatus defined in claim 1 wherein the padded blocks are received by the apparatus one after another at a predetermined rate, and wherein the apparatus further comprises:
    means for outputting unpadded blocks at the predetermined rate.

3. The apparatus defined in claim 2 further comprising:
    means for registering each successive padded block.

4. The apparatus defined in claim 3 wherein the means for registering is at least partly controlled by the second further clock signal.

5. The apparatus defined in claim 4 further comprising:
    means for removing padding from each padded block registered by the means for registering to produce a corresponding unpadded block.

6. The apparatus defined in claim 5 further comprising:
    means for converting each unpadded block to a plurality of successive sub-blocks.

7. The apparatus defined in claim 6 wherein the means for converting is at least partly controlled by the second further clock signal.

8. The apparatus defined in claim 1 wherein each padded block consists of 66 bits of data, and each unpadded block consists of 64 bits of data.

9. The apparatus defined claim 1 wherein the means for deriving comprises:
first frequency dividing circuitry for dividing frequency of a common signal by a first division factor to produce the second further clock signal, the common signal being derived from but having a different frequency than the reference clock signal.

10. The apparatus defined in claim 9 wherein the means for deriving further comprises:
second frequency dividing circuitry for dividing the frequency of the common signal by a second division factor to produce the first further clock signal.

11. The apparatus defined in claim 9 wherein the means for deriving further comprises:
frequency multiplying circuitry for multiplying frequency of a signal being derived from but having a different frequency than the reference clock signal to produce the common signal.

12. The apparatus defined in claim 11 wherein the means for deriving further comprises:
frequency pre-division circuitry for dividing frequency of the reference clock signal by a pre-division factor to produce the signal operated on by the frequency multiplying circuitry.

13. The apparatus defined in claim 2 wherein the reference clock signal has a reference frequency having an integer-based relationship to the predetermined rate.

14. The apparatus defined in claim 13 wherein the means for deriving comprises:
means for performing integer-based manipulation of the reference frequency to produce the first and second further clock signals.

15. The apparatus defined in claim 14 wherein the means for performing comprises:
first means for performing first integer-based manipulation of the reference frequency to produce a common signal; and
second means for performing second integer-based frequency manipulation of the common signal to produce the second further clock signal.

16. The apparatus defined in claim 15 wherein the means for performing further comprises:
third means for performing third integer-based frequency manipulation of the common signal to produce the first further clock signal.

17. The apparatus defined in claim 1 wherein the means for using the second further clock signal comprises:
byte alignment circuitry for using the padding of the padded blocks to locate data block boundaries.

18. A method of receiving and unpadding, successively received, padded blocks of data, each of the padded blocks of data including a first number of data bits that are initially received serially in a serial data signal, and each of the padded blocks being converted by the method to an unpadded block that includes a second number of data bits that is less than the first number, the method comprising:
deriving from a reference clock signal a common signal;
producing first and second further clock signals from the common signal;
using the first further clock signal in at least some processing of the padded data, including using the first further clock signal to assemble in parallel from the serial data signal a group of successive data bits equal in number to the first number without regard for where in the group padding bits occur; and
using the second further clock signal in at least some processing of the unpadded data, including using the second further clock signal to separate from successive ones of the groups successive unpadded blocks and to output each of said unpadded blocks in parallel, wherein the first and second further clock signals have respective, different, first second frequencies, at least one of which is different from frequency of the common signal.

19. The method defined in claim 18 wherein the common signal frequency is different from frequency of the reference signal.

20. The method defined in claim 18 wherein the first and second frequencies are both different from the common signal frequency.

21. The method defined in claim 18 wherein the deriving comprises:
using integer-based frequency manipulation of the reference clock signal to produce the common signal.

22. The method defined in claim 18 wherein the producing comprises:
using integer-based frequency manipulation of the common signal to produce at least one of the first and second further clock signals.

23. Apparatus for receiving and unpadding, successively received, padded blocks of data, each of the padded blocks of data including a first number of data bits that the apparatus initially receives serially in a serial data signal, and each of the padded blocks being converted by the apparatus to an unpadded block that includes a second number of data bits that in less than the first number, the apparatus comprising:
first circuitry adapted to derive from a reference clock signal a common signal;
second circuitry adapted to produce first and second further clock signals from the common signal;
third circuitry adapted to use the first further clock signal in at least some processing of the padded data, including using the first further clock signal to assemble in parallel from the serial data signal a group of successive data bits equal in number to the first number without regard for where in the group padding bits occur; and
fourth circuitry adapted to use the second further clock signal in at least some processing of the unpadded data, including using the second further clock signal to separate from successive ones of the groups successive unpadded blocks and to output each of said unpadded blocks in parallel, wherein the first and second further clock signals have respective, different, first and second frequencies, at least one of which is different from frequency of the common signal.

24. The apparatus defined in claim 23 wherein the common signal frequency is different from frequency of the reference clock signal.

25. The apparatus defined in claim 23 wherein the first and second frequencies are both different from the common signal frequency.

26. The apparatus defined in claim 23 wherein the first circuitry comprises:
circuitry for performing integer-based frequency manipulation of the reference clock signal to produce the common signal.

27. The apparatus defined in claim 26 wherein the second circuitry comprises:
circuitry for performing integer-based frequency manipulation of the reference clock signal to produce the common signal.

* * * * *